United States Patent [19]

Mikan

[11] Patent Number: 5,428,367
[45] Date of Patent: Jun. 27, 1995

[54] COMPUTER MOUSE SIMULATOR HAVING SEE-THROUGH TOUCHSCREEN DEVICE AND EXTERNAL ELECTRONIC INTERFACE THEREFOR

[76] Inventor: Peter J. Mikan, 31 Greenfield Rd., Milford, Conn. 06460

[21] Appl. No.: 959,754

[22] Filed: Oct. 13, 1992

Related U.S. Application Data

[63] Continuation-in-part of Ser. No. 726,389, Jul. 8, 1991.

[51] Int. Cl.[6] ............................................. G09G 3/02
[52] U.S. Cl. ..................................... 345/157; 345/173
[58] Field of Search ............... 340/709, 712, 706, 711; 178/18; 356/375; 345/145, 156, 157, 159, 173

[56] References Cited

U.S. PATENT DOCUMENTS

| | | | |
|---|---|---|---|
| 4,763,356 | 8/1988 | Day, Jr. et al. | 178/18 |
| 4,819,194 | 4/1989 | Koizumi et al. | 178/18 |
| 4,821,029 | 4/1989 | Logan et al. | 178/18 |
| 4,823,170 | 4/1989 | Hansen | 356/375 |
| 4,903,012 | 2/1990 | Ohuchi | 340/709 |
| 4,904,857 | 2/1990 | Ando et al. | 340/712 |
| 4,983,786 | 1/1991 | Stevens et al. | 178/18 |

FOREIGN PATENT DOCUMENTS 2139762  11/1984  United Kingdom ................ 340/712

OTHER PUBLICATIONS

Publication–"The right touch for control", Wayne Wehrer, Reprint from I & CS–Feb. 1989, 4 pages.
Publication–Euchner Finger Mouse descriptive brochure Euchner+Co. Oct. 1989, 4 pages.
Publication–Euchner-Fingermaus descriptive brochure, Euchner+Co. Mar. 1989, 2 pages.
Publication–Ad Showcase Macweek Oct. 30, 1990, "UnMouse: More speed. Less space." Mirco Touch Systems, Inc., 1 page.
Publication–"Workstation features graphic user interface and mouse emulator", I&CS Apr., 1991, 2 pages.
Publication–"Product Spotlight", Monitormouse, Infoworld, Jul. 23, 1990, p. 13, 1 page.
Publication–OS/2 and Windows Magazine, Nov. 1990, vol. 1, No. 3, "Monitor Mouse", 4 pages.
Publication–Application Development Tools, Elographics, 1989, 4 pages.
Publication–Elographics, "All the building blocks . . . touchscreen applications." Elographics, 1989, 8 pages.
Publication–Elographics, "Pre-Comdex Release", Oct. 1990; 5 pages.
Publication–AccuTouch Touchscreen, Elographics, 1991, 2 pgs.
Publication–IntelliTouch Touchscreen, Elographics, 1991, 2 pgs.
Publication–DuraTouch Touchscreen, Elographics, 1991, 2 pages.
Myers, Brad A., "Creating Interaction Techniques by Demonstration," IEEE CC & A, Sep. 1987, pp. 51–60.
"Carroll Touch Announces New Add-Touch (R) Products for the Zenith ZCM-1492 Monitor and El Displays," News Release: Dateline: Round Rolk, Tex. Aug. 13, 1990.
"IBM to Unwrap New Systems", *Computer Reseller News,* Jun. 10, 1991, p. 1.

*Primary Examiner*—Tommy P. Chin
*Assistant Examiner*—A. Au
*Attorney, Agent, or Firm*—H. Gibner Lehmann; K. Gibner Lehmann

[57] ABSTRACT

An electronic mouse simulator for a computer having a dedicated mouse port connector receptacle, the simulator having a multi-conductor cable and connector adapted to plug directly into the dedicated mouse port connector receptacle. The simulator includes a touchscreen device and a converter having an EPROM and program firmware therefor. The touchscreen device is preferably positioned in front of or displaced laterally, above, below, or to the side of the screen of the display monitor used with the computer. The converter accepts signals from the touchscreen device and transforms them into a mouse-compatible format or mouse-compatible protocol that can be used to directly communicate through the dedicated mouse port of the computer. No modification of the computer is required; nor is special software needed, since the signals transferred at the mouse port duplicate those which would normally be transferred with a conventional mouse. The high resolution available with an expansive touchscreen is enjoyed, without sacrificing desk or table space.

25 Claims, 3 Drawing Sheets

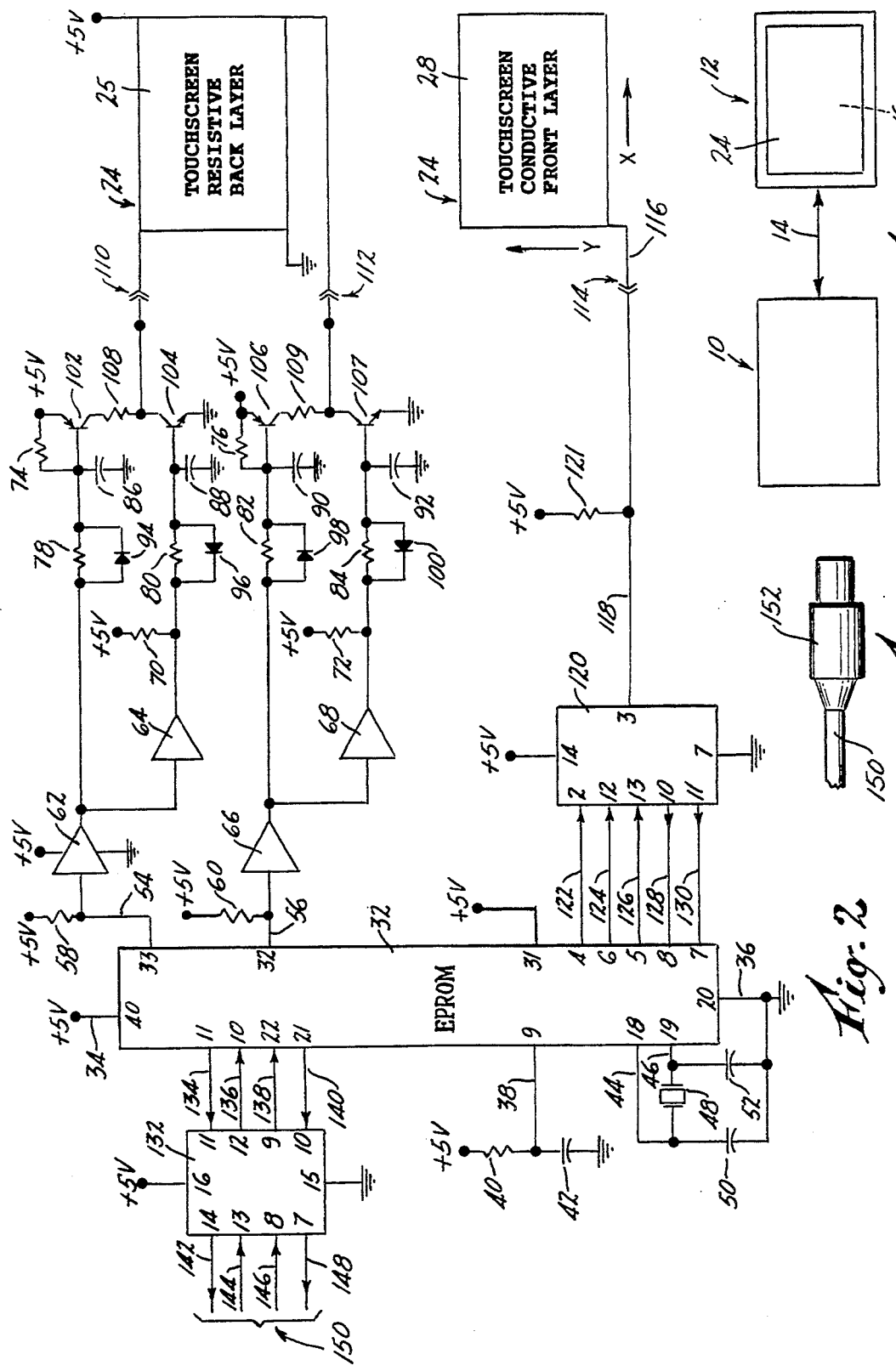

COMPUTER MOUSE SIMULATOR HAVING SEE-THROUGH TOUCHSCREEN DEVICE AND EXTERNAL ELECTRONIC INTERFACE THEREFOR

STATEMENT AS TO RIGHTS TO INVENTIONS MADE UNDER FEDERALLY-SPONSORED RESEARCH AND DEVELOPMENT

Research and development of the present invention and application have not been Federally-sponsored, and no rights are given under any Federal program.

CROSS REFERENCES TO RELATED APPLICATIONS

The present application is a continuation-in-part of my copending application U.S. Ser. No. 07/726,389 filed Jul. 8, 1991, entitled COMPUTER MOUSE SIMULATOR DEVICE.

BACKGROUND OF THE INVENTION

1. Field of the Invention

This invention relates accessories for computers, and more particularly to devices for facilitating the movement of a cursor to a particular point or area on the screen of a computer monitor.

2. Description of the Related Art Including Information Disclosed Under 37 CFR ÅÅ1.97–1.99

Touchscreens have been employed successfully for a number of years in connection with the control of movement of a cursor over a CRT monitor of a computer.

In general, touchscreens of necessity require accompanying hardware and software, where the hardware can be either located on-board the computer, or else contained in an accessory unit having the capability of plugging into one of the computer's expansion slots.

A number of touchscreen devices are currently being manufactured and sold by Elographics, of Oak Ridge, Tenn. All employ a dedicated controller (hardware) which is plugged into a serial port or expansion slot of the computer. Another product manufactured by Elographics is a mouse emulator for Microsoft Windows applications. A touch panel is installed over the face of a display monitor. A ribbon cable runs from the touchscreen panel to a controller board, which can either be installed in an expansion slot, or in a small external box. The touchscreen controller processes the touches, including scaling and translating the touch location coordinates, and setting baud rates, if needed, for proper communication between the controller and the host computer, via the expansion slot.

Another mouse-type device, known by the name INTERACT, is produced by Nematron, of Ann Arbor, Mich. This is a combination of hardware consisting of a touchscreen and accompanying software. The unit features a three square inch touchpad that can be employed in place of the touchscreen. The various functions available on a touchscreen can be largely duplicated by the touchpad.

Still another touch-sensitive controller is that manufactured by Micro Touch Systems, Inc., of Wilmington, Mass., and known as UnMouse. It consists of a touch-sensitive tablet that enables control of movement of the cursor at a greatly increased speed. This device is intended to be installed in an expansion slot of an existing Mac or PC.

All of the touchscreens noted above require an electronic interface to convert the analog voltages produced by touching the screen into appropriate digital information. The circuitry which performs the conversion is, to the best of my knowledge, always either connected to a serial input/output port on the computer, or located on an expansion card inserted into one of several expansion slots usually provided in most PCs. In addition, special software is almost always required in order render these systems compatible with the particular PC being employed.

There arise a number of disadvantages with the existing approaches to cursor control involving touchscreens and/or touchpad devices:

1. In particular, the required hardware to support such devices inevitably uses up at least one expansion slot of the machine, making this slot unavailable for other uses or applications. Alternately, the hardware must be connected to the serial input/output port of the computer.

2. Driver software must almost always be custom designed to each version of a particular PC in spite of certain similarities in PC hardware.

3. The necessity for use of additional software also results in a related tie-up of at least some of the useable memory or storage capacity, which is always considered a drawback.

4. The driver software must be checked for proper operation and compatibility with different application programs, in spite of apparent similarity in the PC hardware being employed.

5. Where touchscreens are mounted over the face of a CRT monitor, care must exercised in matching the curvature of the touchscreen to that of the monitor face. Since the monitor face is glass, and the touchscreen also employs a glass base, adjustment of this curvature is seldom, if ever, possible. As a result, the phenomenon known as parallax enters the picture, and control of the cursor through movement of the user's finger often becomes sloppy at best, resulting in poor resolution of movement and increased difficulty in use. Irritation and fatigue by the user is also commonly experienced.

6. In addition to the problems noted above in the previous paragraph, the relatively recent adoption of different screen sizes and configurations complicates the adaptability of touchscreens to a multiplicity of PCs, and thus a truly "universal" touchscreen adaptable to a wide variety of PCs is not available.

7. Where hardware manufactured by one company and software manufactured by a second company are combined, difficulties involving poor incompatibility or marginal compatibility are frequently present. Oftentimes the customer is left in somewhat of a dilemma, since his system may be down and neither manufacturer can, with definity, and charged with coming up with a "fix" to render the system operative, as a whole.

This potential incompatibility issue is especially true where the computer has a series of expansion slots and-/or a serial input/output port, for connecting accessories to the computer.

8. Further, with most touchscreens which are applied directly over the front face of a monitor, the cursor jumps from a predetermined position to a point just beneath that where the user touches the screen, following which the user's view of the cursor can be often blocked by his own finger. The resulting resolution can be impaired, since it may be necessary to lift one's finger off the touchscreen, view the cursor, and make further corrections in its position by re-touching the screen.

9. Also, to the best of my knowledge, there do not exist any combination mouse port/touchscreen systems which automatically emulate or simulate activation of one or more switches corresponding to those of a mouse, by enabling the user to depress "key-input" locations disposed at particular areas of a touchscreen, as for example, at two or three locations along the bottom edge of a screen.

10. Prior mouse simulators in the form of touch key pads, have the disadvantage that if they are physically small, they have poor resolution; if they are large, they occupy too much desk space, thus sacrificing such space in return for improved resolution.

SUMMARY OF THE INVENTION

The above disadvantages and drawbacks of prior cursor control systems are largely obviated by the present invention which has for one object the provision of a novel and improved electronic computer mouse simulator which is both simple in its construction and reliable in its operation, and which can be readily connected to and employed with the dedicated mouse port of an existing computer without any modification to the computer's electronic hardware or its software. Service and installation of the monitor and computer are not affected, since the simulator can be readily unplugged from the mouse port connector receptacle, and a standard mouse substituted therefor.

Still another object of the invention is to provide an improved mouse simulator as above set forth, wherein there is absolutely no connection to either the conventional expansion slots or serial input/output port of the computer. In contrast, only the dedicated mouse port is used, thereby making available the serial port and all such expansion slots for other functions, such as expanded memory, back-up tape drives, interface connection to adjacent workstations, and the like. This guarantees compatibility with all future software of a type employing a mouse.

A still further object of the invention is to provide an improved mouse simulator in accordance with the foregoing, where no reliance is placed on use of any part of the computer memory, thus fully retaining such memory for other uses and applications.

Another object of the invention is to provide an improved mouse simulator as above described, which is inherently completely immune to compatibility problems that might otherwise arise between software and hardware associated with both the simulator and with the computer, since the computer "sees" no difference at its mouse port connector receptacle when the mouse simulator is used, as compared to when a conventional mouse is used. In this connection, troubleshooting is greatly simplified; should a problem of questionable origin arise, it is a simple matter to unplug the mouse simulator, connect a conventional mouse in its place, and thus determine with a high degree of certainty, the source of the problem, i.e. the simulator, or the computer itself.

Yet another object of the invention is to provide an improved mouse simulator of the kind indicated, wherein there is provided at the mouse port connector cable of the simulator, an essentially exact duplication of a mouse protocol by the simulator, namely binary information in serial format relating to X-axis and Y-axis movement obtained from a touchscreen positioned in front of or laterally of the computer monitor, as well as binary information in serial format relating to either single switch or multi-switch activation of a portion of the touchscreen corresponding to single switch or multi-switch activation of respective switches of a mouse useable with said mouse port.

Yet another object of the invention is to provide a novel and improved mouse simulator as above, which takes full advantage of the ease of a touchscreen to control movement of a screen cursor, but which does so solely through connections made to the computer's existing dedicated mouse port.

A still further object of the invention is to provide an improved mouse simulator in accordance with the foregoing, wherein different modes of touchscreen operation can be utilized, including multiple cursor control modes such as absolute or proportional movement, and velocity control movement, and wherein there is built into the touchscreen, emulations of one or more switch functions of a conventional mouse.

Yet a further object of the invention is to provide an improved mouse simulator as above characterized, which is physically large in size so as to provide a desired, high degree of resolution and control, while at the same time not sacrificing, in the least, available desk space, since the touchscreen portion of the simulator can be mounted in front of the computer display screen, an area which is already available and has the physically large X and Y dimensions needed to accommodate a physically large touchscreen/mouse simulator. Thus, the simulator enjoys the advantage of high resolution with no loss in desk or table space. The same cannot be said of the existing touchpad devices or mouse emulators of which I am aware.

A still further object of the invention is to provide an improved mouse simulator of the kind indicated, wherein the undesirable effects of parallax are eliminated, and where less criticality is required as to physical dimensioning, curvature, and positioning of the touchscreen device. The latter can deviate in absolute size from that of the monitor screen, since both a relative and an absolute movement relationship exists between finger displacement and cursor movement. The touchscreen device can even be somewhat larger or smaller in its X-Y dimensions than those of the monitor screen, and the touchscreen device can be mounted an any flat surface either in front of the monitor screen, or displaced laterally therefrom (above, below, to the side, or even on another support or panel).

Thus a relatively few different touchscreen configurations are needed to accommodate a wide range and shape (curvature) of existing or future monitor screens.

Still another object of the invention is to provide a mouse simulator as above set forth, wherein there is eliminated any need for the user to calibrate the simulator. Operational technique is readily assimilated by the user, and correction of operator-generated mistakes involves merely release of the touchscreen device, and re-application of the user's finger and movement thereof in appropriate compensating directions.

The above objects are accomplished by an electronic mouse simulator for a computer having a dedicated mouse port connector receptacle, and a monitor with a display screen. The simulator comprises a touchscreen device adapted to be positioned in front of or laterally of the screen of the computer monitor. The touchscreen device further has an electrical output circuit characterized by an electrical parameter (a.c. and or d.c. voltage or current; resistance; impedance; frequency; pulse characteristic) which varies in accordance with the position of a pointer directed toward the front of the touchscreen device. The simulator further includes a multi-conductor cable and electrical connector carried thereby and adapted to be connected directly to the dedicated mouse port connector receptacle of the computer. There are provided electronic conversion means having input circuitry coupled to the output circuit of the touchscreen device, and for converting the parameter from the touchscreen device output circuit into binary format. The electronic conversion means has an output circuit for supplying data in this binary format. Finally, there are further provided additional electronic means including a programmed microprocessor having input circuitry connected with the output circuit of the electronic conversion means, the input circuitry receiving the binary format from the electronic conversion means output circuit, and the additional electronic means has mouse-compatible output circuitry adapted for direct connection to the dedicated mouse port of the computer. By the above arrangement, the mouse simulator essentially completely emulates, through the dedicated mouse port, control functions of a conventional mouse if the latter were to be connected to the mouse port and adapted for use with the computer.

The above objects are further accomplished by an electronic mouse simulator for a computer having a monitor with a display screen and a dedicated mouse port, the simulator comprising a resistive-type touchscreen device adapted to be positioned in front of or laterally of the screen of the computer monitor and having an expansive surface characterized by an X-axis and a Y-axis. The touchscreen device has front and back planes with single and multiple connections respectively. There is provided an analog-to-digital converter having input circuitry and output circuitry, with the input circuitry being connected to the front plane of the touchscreen device. Electronic means including a solid state multiplexer are connected to the multiple connections of the back plane of the touchscreen device, thereby to alternate the voltages applied to the back plane between vertical and horizontal directions. The arrangement is such that touching of the front plane impresses the alternate voltages on the input circuitry of the analog-to-digital converter. Additional electronic means including a microprocessor and a mouse interface driver are provided, the microprocessor being connected with the output circuitry of the analog-to-digital converter, for continuously monitoring the digital output thereof and for continuously converting digital signals received from the analog-to-digital converter to digital signals to be applied to the mouse driver. The mouse driver has an output circuit and transfers signals correlated to the location of the pointer on the touchscreen device, such signals emulating those produced by a conventional mouse connected to the dedicated mouse port of the computer as the mouse is moved in X-axis and Y-axis directions.

The objects are further accomplished by an electronic mouse simulator for a computer having a dedicated mouse port connector receptacle, the mouse simulator comprising a touchscreen device having an electrical output circuit characterized by an electrical parameter which varies in accordance with the X-axis and the Y-axis positions of a pointer directed toward the front of the touchscreen device, a multi-conductor cable and electrical connector carried thereby and adapted to be connected directly to the dedicated mouse port connector receptacle of the computer, and electronic means including an analog-to-digital converter having an input circuit connected with the touchscreen device output circuit, and having an output circuit. The electronic means includes a programmed microprocessor having input circuitry connected with the output circuit of the analog-to-digital converter, and the electronic means has output circuitry connected to the multi-conductor cable. The electronic means generates electrical signals which substantially emulate signals representing X-axis movement of an operative mouse normally connected to the mouse port connector receptacle when the pointer is moved in an X-axis direction, and which substantially emulate signals representing Y-axis movement of an operative mouse normally connected to the mouse port connector receptacle when the pointer is moved in a Y-axis direction, and the electronic means further transmits the signals through its output circuit and through the multi-conductor cable, to the dedicated mouse port connector receptacle of the computer.

Other features and advantages will hereinafter appear.

BRIEF DESCRIPTION OF THE DRAWINGS

In the drawings, illustrating a preferred embodiment of the invention:

FIG. 2 is a schematic circuit diagram of the mouse simulator of the invention, illustrating particularly a touchscreen device and electronic interface circuitry employed in carrying out the invention.

FIG. 6 is a side elevation of an electrical connector as employed with the mouse simulator, and which connector is adapted for direct connection with the dedicated mouse port electrical connector receptacle of the computer.

FIG. 7 is an algorithm or flow chart, setting forth in general terms, the mode of operation of the mouse simulator of the invention, and from which there was prepared a program for loading into a microprocessor of the EPROM variety and which is employed in the interface circuitry of the invention.

DESCRIPTION OF THE PREFERRED EMBODIMENT

Figure 1:
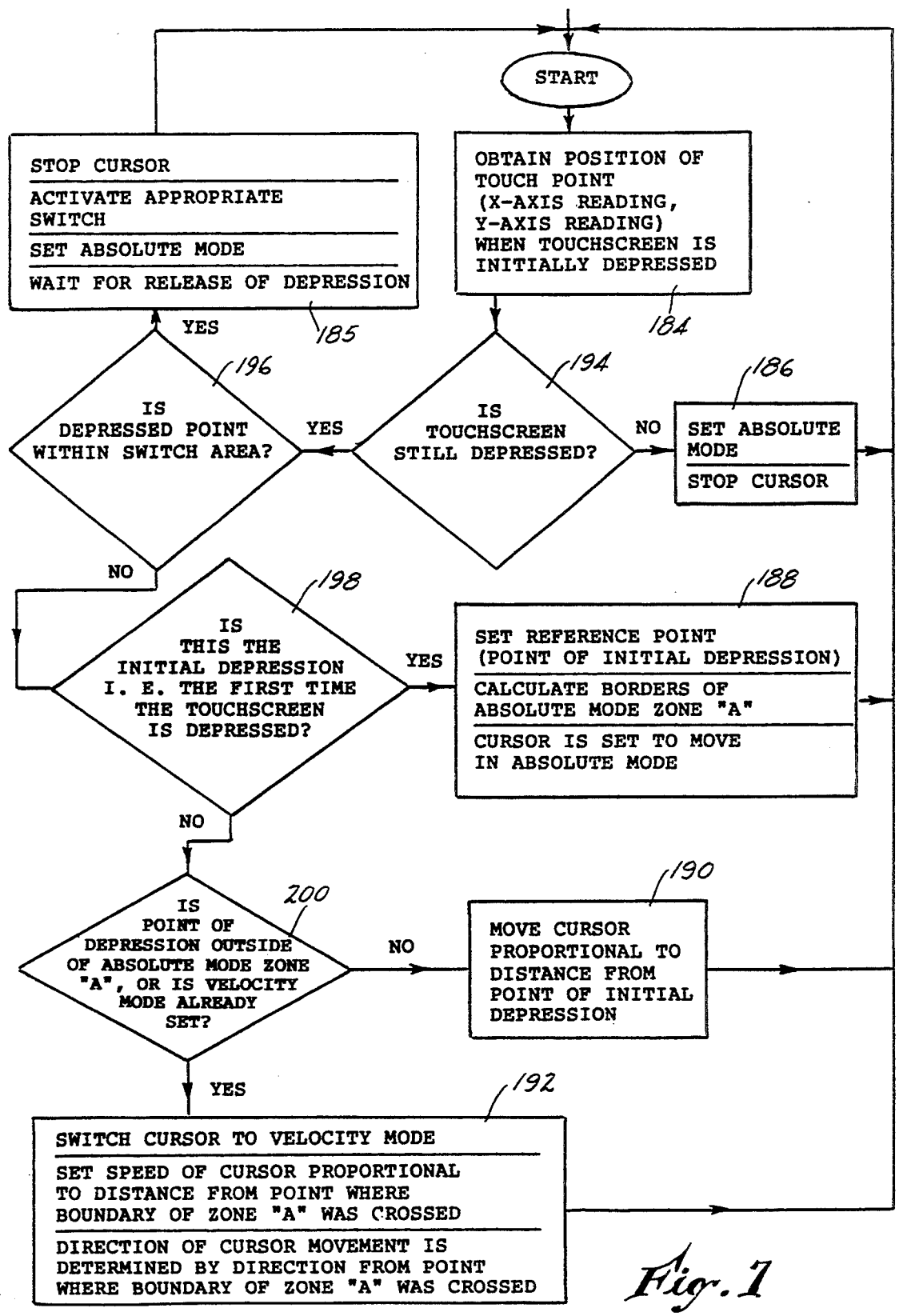
FIG. 1 is a simplified block diagram of a computer and display monitor, having a touchscreen device of a type adapted to overlie a curved monitor screen, the touchscreen device being mounted in front of the screen and coextensive therewith.

Referring first to FIG. 1, there is illustrated a computer and monitor having an expansive display screen 16, the computer having the usual mouse-compatible hardware, and in addition, conventional mouse-compatible software installed therein the computer being shown diagrammatically and being generally designated by the numeral 10. The monitor is indicated at 12. A multi-conductor cable 14 extends from the monitor to the computer, which latter may contain one or more serial input/output ports, one or more internal expansion slots, and optionally, additional connections for a modem, keyboard, printer and other accessories (not shown). The CRT containing the screen 16 is mounted in the monitor 12. A touchscreen device 24 is shown directly overlying the screen 16.

Figure 8:
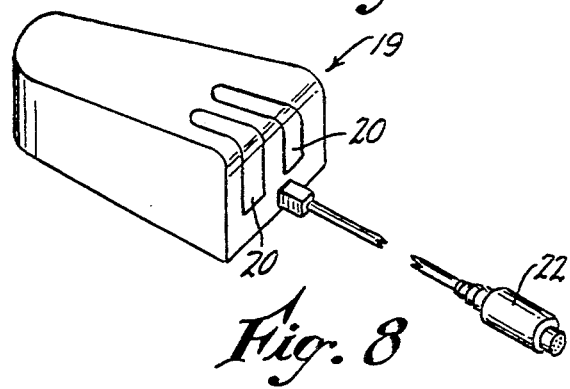
FIG. 8 is a perspective view of a conventional or generic mouse and electrical connector of a type adapted to be connected to the dedicated mouse port of the computer. The mouse simulator of the invention is intended to be a direct substitution for this mouse, the connector of FIG. 6 being directly substitutable for the connector of FIG. 8.

The present invention concerns a touchscreen device for use with the existing monitor, and an interface unit which connects between the touchscreen device and the dedicated mouse port of the computer, and which interface unit transmits to and/or receives from the dedicated mouse port, signals which substantially completely emulate those which are characteristic of a conventional mouse, and which signals are correlated to and result from specific events which occur at the touchscreen device. A conventional mouse is illustrated in FIG. 8 and designated by the numeral 19. It has mouse switches 20, a multi-conductor cable, and a connector 22 which is normally adapted for connection to the dedicated mouse port connector receptacle of the computer.

By a unique combination of firmware and hardware in the interface, as will be described below, movements of a pointing device such as a user's finger, glove, wand or other pointing instrument, over a field of travel such as the touchscreen device surface, as well as over predefined areas of the touchscreen device, are converted to a digital format which substantially completely simulates or emulates a that of mouse, and thus such digital format is directly communicatable with a dedicated mouse port as mouse port-compatible signals from the interface. The signals direct the computer to move the display screen's cursor in accordance with and in direct correlation to the designated activity at the touchscreen device. More specifically, the interface in effect converts the touchscreen device signals to standard mouse-protocol signals, and sends/receives such signals to and from the dedicated mouse port connector receptacle of the computer, without the need for modifications of any other kind to the computer, be it software, hardware, firmware, or internal or external connections to expansion slots or serial ports thereof.

Figure 3:
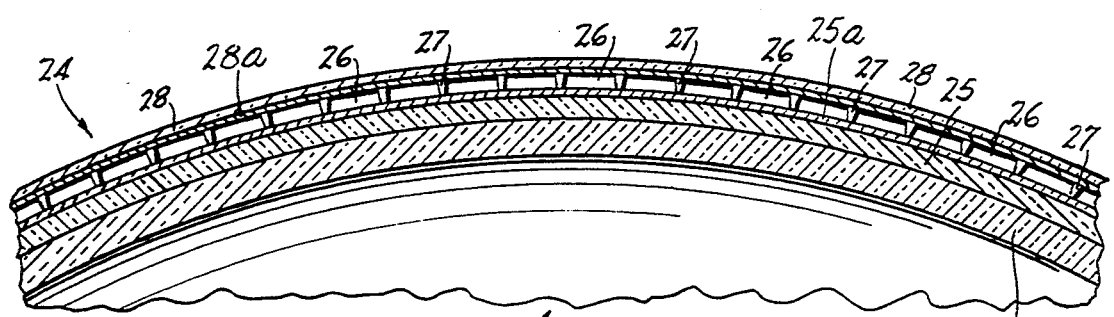
FIG. 3 is a fragmentary view, partly in elevation, and partly section, showing details of the contoured or curved touchscreen device of FIGS. 1 and 2.

Reference will now be made to FIGS. 2 and 3, FIG. 2 illustrating a schematic circuit diagram of the interface unit and touchscreen device, and also the electrical leads constituting the direct connections to the dedicated mouse port connector receptacle of the computer.

The touchscreen device is diagrammatically indicated at 24 in FIG. 2, and is described hereinbelow as an example of one type of touchscreen device which can be used in carrying out the present invention. The touchscreen device 24 illustrated is of the resistive-overlay type, and is depicted in fragmentary section in FIG. 3.

Other types of touchscreen devices could be employed in place of the resistive-overlay type, as for example, scanning infrared beam, capacitive overlay, and surface acoustic wave (SAW) types. Also, perfectly planar touchscreen devices could be used, since it is not necessary to match the monitor's screen curvature as has been illustrated in FIG. 3.

Referring again to FIG. 3, the resistive-overlay touchscreen device 24 comprises a glass base layer 25 which can directly overlie the display monitor screen 16, the base or back layer 25 incorporating a first thin transparent or see-through electrically conductive metallic coating 25a applied to its upper surface in the figure, an air gap 26 which contains a plurality of uniformly spaced insulators 27, and a clear or see-through flexible front layer 28, having on its underside a thin transparent or see-through electrically conductive metallic coating 28a similar to that on the front of the base layer 25. The insulators 27 are constituted of plastic, and in the absence of pressure applied to any point on the front layer 28, the two metallic coatings are maintained in spaced relation and electrically insulated. A slight pressure applied to any point on the front layer 28 results in a minute deflection of the layer such that the metallic coating thereon comes in contact with the metallic coating on the back layer 25.

By alternately applying X-axis and Y-axis voltages to one vertical edge and one horizontal edge of the back layer 25, voltage gradients are set up in this layer, and when the metallic coating of the front layer 28 comes into contact with the coating of the back layer 25, the magnitudes of the voltage gradients provide an indication of the exact location of the point being depressed, in both an X-axis and a Y-axis direction. Stated differently, touching the touchscreen device 24 at any particular location produces a pair of analog voltages, which can be considered as constituting an electrical output parameter of the touchscreen device, representing respectively X-axis and Y-axis coordinates of the point of contact. This information is in turn converted into binary format which is employed to generate the signals necessary to feed directly into the dedicated mouse port connector receptacle of the computer, as will be explained below.

While the touchscreen device is illustrated in FIG. 3 as being installed directly on the monitor screen, the touchscreen device could alternately be mounted in a position spaced from the screen, and either in front of or displaced laterally therefrom. As another possibility, the touchscreen device 24 could be located remotely from the screen 16, i.e. above or below it, as for example in a standard rack panel.

As noted above, FIG. 2 illustrates, in addition to the touchscreen device 24, the electronic interface means or interface circuit which adapts the touchscreen device signals to mouse port-compatible format. The interface means employs a microcomputer or microprocessor 32 which serves essentially two functions: 1) to generate a multiplexing signal for use in driving the touchscreen device 24; and 2) to process digital signals that are indicative of the activity which occurs at the touchscreen device 24 and to convert them to mouse-compatible format or protocol on an electrical cable that is suitable for direct connection to a mouse driver circuit whose output connects with the dedicated mouse port connector receptacle of the computer. The microcomputer or microprocessor 32 has power supply connections 34, 36, and also a reset terminal 38 connected to a delay circuit 40, 42, such that when power is initially applied, the reset terminal 38 is initially held near ground until stability in the microprocessor is established. Terminals 44 and 46 are connected to a circuit containing a crystal 48 and capacitors 50, 52, the crystal being employed in an oscillator contained in the microprocessor and which provides a high accuracy clock signal to the unit and also synchronizes communication between it and an analog-to-digital converter to be described below.

Various active and passive electrical components of FIG. 2 include supply voltage connections which, in the present interface, are ground and +5 volts, respectively. The latter are indicated in the drawing by the designation "+5 V", at the appropriate locations.

In connection with the multiplexing function of the microprocessor 32, there are generated internally, complementary, synchronized square wave signals on leads 54 and 56. Resistors 58 and 60 are for biasing purposes. The outputs on leads 54 and 56 are in turn fed to buffer stages 62, 64 and 66, 68. Resistors 70, 72, 74 and 76 are also for biasing. Resistors 78, 80, 82 and 84, capacitors 86, 88, 90 and 92, and diodes 94, 96, 98 and 100 are for filtering against transients, and complementary transistors 102, 104 and 106, 107 constitute drivers for the touchscreen device 24. Resistors 108 and 109 constitute loads, respectively. Essentially the function of the circuitry disposed between leads 54, 56, and the touchscreen device 24, is to boost the output current capability of the microprocessor 32 to a level sufficient to drive the back layer 25 of the touchscreen device 24. Disconnect plugs and jacks 110, 112 and 114 are optionally provided between the touchscreen device 24 and the interface circuitry.

The amplifiers indicated by the numerals 62, 64, 66 and 68 can be conventional operational amplifiers/comparator switches, and are not critical as to component type. All four units are preferably contained in a single package.

The square wave output on lead 54 is typically 500 Hz, with the length of each cycle thereby being on the order of 2 msec. or so.

A similar signal appears on lead 56, 180° out of phase with that on lead 54.

The output signals from complementary transistors 102, 104 and 106, 107, having the square wave forms indicated above are applied to opposite corners of the back layer 25, to produce X-axis and Y-axis voltage gradients thereacross.

When a point on the front layer 28 of the touchscreen device 24 is depressed, the layer 28 senses the 500 Hz square wave. Due to the gradients across the touchscreen device back layer 25, the voltages on each half cycle of the square wave are reduced to values between zero and +5 volts, such values respectively indicating X-axis and Y-axis coordinates of the point of depression of the front layer 28. Movement of the point in an X-axis direction will thus affect the value of those half cycles corresponding to X-axis location, and movement of the point in a Y-axis direction similarly affecting the value of those half cycles corresponding to Y-axis location.

Each point on the touchscreen device 24 thus gives rise to a unique value of X, Y coordinate voltages on an output line or output circuit 116 of the touchscreen device 24.

The voltage on line 116 is then applied to the input 118 of an analog-to-digital converter designated 120. A biasing resistor 121 extends to +5 volts, as shown. The analog voltages represented by the square wave input to the A-D converter 120 are thereby converted into serial binary form, with the resulting data still representing X and Y coordinates of the point of depression on the touchscreen device 24.

The analog-to-digital converter 120 can be of a type identified by the number AD0833, manufactured by National Semiconductor. The pin numbers within the box correspond to those of this unit.

Multiple interconnections 122, 124, 126, 128 and 130, between the A-D converter 120 and microprocessor 32 are provided. Line 122 is identified as a "chip select" line, and carries either a zero or +5 volt level, depending on the type of A-D converter employed; line 124 is a clock, to provide synchronization of data transmitted from the A-D converter 120 to the microprocessor 32. Lines 126 and 128 are identified as "data in" and "data out" lines respectively, carrying the information relating to the X and Y coordinates indicated above. Finally, line 130 is identified as a "SARS" output from the A-D converter, which provides information to the microprocessor 32 relating to completion of the transmission of data from the A-D converter to the microprocessor.

The nature of the signal on line 128 is an 8 bit word representing the X and Y coordinates of the point on the touchscreen device 24 which is being depressed. This signal is converted in the microprocessor 32 to an output signal, in serial binary format. Because the voltage levels of this output are in the present instance, restricted to values between zero and +5 volts, as dictated by the power supply with which the microprocessor 32 is employed, a mouse driver circuit 132 is preferably employed to convert TTL/CMOS input signals into RS-232 output signals (or vice-versa), the RS-232 format being characteristic of a majority of existing mouse port protocols, and having become, to a large extent, standard throughout the industry.

The mouse driver 132 can be of a type identified by the number MAX232, manufactured by Maxim Integrated Products. The pin numbers in the box correspond to those of this unit.

Figure 9:
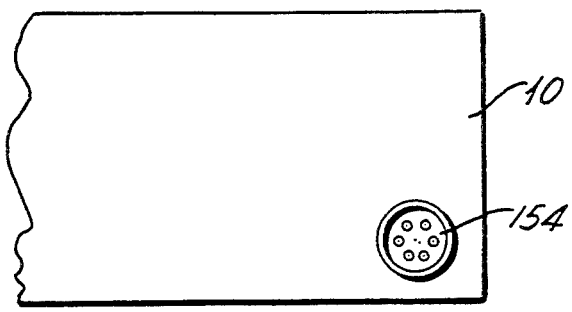
FIG. 9 is a fragmentary elevation of the rear panel of the computer, and illustrating its dedicated mouse port connector receptacle.

Data lines extending between the microprocessor 32 and the driver circuit 132 are indicated 134, 136, 138 and 140. The converted lines 142, 144, 146 and 148 are electrically mouse port compatible, making up a composite cable 150, FIG. 6, having an electrical connector 152 that is adaptable to be directly plugged into a dedicated mouse port connector receptacle on the computer. Such a dedicated mouse port connector receptacle is illustrated in FIG. 9, designated 154, which is usually at the rear panel of the computer 10.

The microprocessor 32 employed in the interface of FIG. 2 is a unit known as a Single-Component 8-Bit Microcomputer (EPROM-externally programmable read only memory) known by the designation 87C51, and manufactured by Intel. It is encased in a sealed, ceramic, 40 lead DIP which includes a window that allows for programming and erasure, which are accomplished by ultraviolet light. The pin numbers shown within the box correspond to those of this unit. The particular techniques involved with converting a program contained on a magnetic disk to ultraviolet light and "burning" (entering) the resultant program into the EPROM are performed on a device known as a PROM (Programmable Read Only Memory) programmer. This procedure per se is known in the art.

In the interest of providing a full and complete disclosure to enable anyone skilled in the art to make and practice the invention, there is annexed hereto a copy of the Source Code corresponding to the program above described and which has been entered into the microprocessor 32. This Source Code is an Assembly Language Program entitled "JV5", and would be used to set up the system to emulate a generic mouse. The program was created by the inventor and was entered, via keyboard, into an IBM compatible PC. A print-out of this resulting Source Code that embodies the Algorithm of FIG. 7 is given in Appendix A attached hereto.

The data format for the "generic" mouse referred to above is an industry standard for a mouse protocol, now in the public domain, and which was originally developed by Mouse Systems Corporation.

The data in the form of the Source Code, while being entered into the PC, is stored on a magnetic diskette. This information on the diskette is thereafter converted, by known techniques, to a data-address file, known in the industry as a Hex file. A print-out of this Hex file is given in Appendix B attached hereto, and constitutes the specific data bytes and their corresponding addresses that were entered, by the inventor, into the 87C51 microprocessor in order to implement the Algorithm illustrated in FIG. 7, and by which the microprocessor 32 is enabled to convert the X, Y coordinate data from the touchscreen device into a format which is suitable for direct connection to the dedicated mouse port connector receptacle of the computer. The title of the Hex file is "JV5.HEX".

The information that is programmed into the EPROM can best be set forth by the Appendix B print out of this Hex File, which as noted above, gives the actual address of each data byte in the programmed EPROM.

By way of explanation, hex file numbers have a base of 16, instead of the usual decimal system. Specifically, decimal numbers 1, 2, 3, 4, 5, 6, 7, 8 and 9 correspond to Hex-base numbers 1, 2, 3, 4, 5, 6, 7, 8 and 9, respectively. Decimal numbers 10-15 correspond to hex designations A, B, C, D, E and F, respectively. Hence the decimal number 11 would be identified by a hex designation 0B, the decimal number 15 by the hex designation 0F, and the decimal number 16 by the hex designation 10.

In the Hex file, each line begins with a colon. The following two digits are known as a header and identify the number of bytes of information which follow and which are contained in this line.

In line 1 of the Hex file, the 3rd-6th digits identify, in the EPROM, the memory location, 0000, of the first data byte which follows, and which is given by the 9th and 10th digits. The 7th and 8th digits are all zeros, and constitute a boundary, but have no other significance. The 9th and 10th digits constitute the first byte of data, 01, entered into the first address, 0000. The 11th and 12th digits constitute the second byte of data, 55, entered into the second address, 0001. The last two digits are known as a check sum, AB, which are used to verify the information contained in the line.

As a further example, in line 2, the 0B indicates that a total of 11 bytes of information is set forth in the line, beginning at location 00B0. The 11 bytes are, respectively, B2 at location 000B; 95 at location 000C; 75 at location 000D; and 8A, D2, 30, 95, 02, D2, 16, and 32, respectively at the next 8 following locations. F1 represents the check sum. The following lines are interpreted in a similar manner.

A discussion of the operation of the touchscreen device 24 and interface circuit will now be given, with later reference being made to the Algorithm illustrated in FIG. 7.

Figure 4:
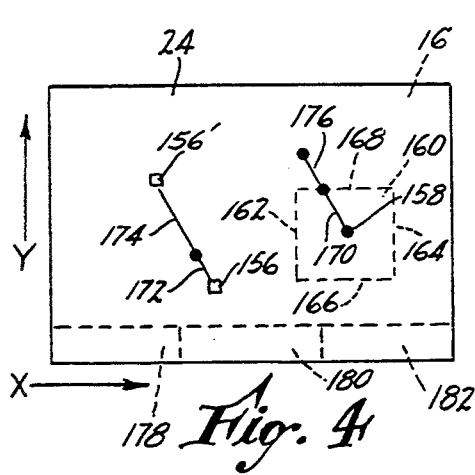
FIG. 4 is a front elevation of the touchscreen device, shown mounted in front of the computer monitor display screen, and illustrating one example of cursor movement control as provided by the invention.

FIG. 4 shows the touchscreen device 24 mounted in front of the screen 16 of the computer monitor 12. X and Y axes are diagrammatically illustrated. The cursor 156 is shown as a small box. According to the Algorithm and resulting program that has been entered into the microprocessor 32 of the interface, operation is as follows: No movement of the cursor occurs if the touchscreen device 24 is not being depressed. (Hereinafter, the term "depress" as applied to resistive overlay touchscreen devices can be thought of as an "activation" of the touchscreen device in general. With different types of touchscreens, such activation need not be made by physical contact with the screen itself, as for example, in the case where a scanning infrared beam device is being employed.) It is intended that the present invention not be restricted to the use of a resistive-overlay touchscreen device, although as presently understood, this type is the most applicable for use in the present invention, as compared to other currently available units.

Figure 10:
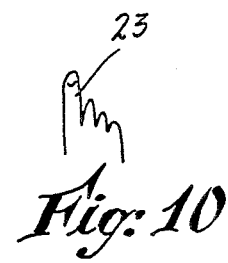
FIG. 10 is a plan view of a pointing device, such as the finger of a user. Other pointing devices, such as wands or styli, could be substituted, if desired.

At such time that it is desired to move the cursor 156, the following sequence is enacted. When the touchscreen device 24 is depressed initially at any random point thereon, as by the user's finger 23, FIG. 10, a reference point 158 identified by an X, Y coordinate pair is established and stored in the microprocessor 32. If no movement of the finger occurs, the cursor 156 remains stationary in its original position.

At the same time that the reference point 158 is established, a well-defined zone, hereinafter referred to as an "absolute mode zone" is also established, surrounding the reference point and having the reference point 158 disposed at the center of the zone. The zone is indicated in dotted outline at 160, and defined by a pair of spaced X-axis coordinates 162, 164, and a pair of spaced Y-axis coordinates 166, 168. In the illustrated embodiment, this zone 160 is rectangular (square), and can be 2 inches high by 2 inches wide. If the operator "drags" his finger within this initially-established zone 160, the direction of movement of his finger will cause a corresponding movement of the cursor 156 in the same direction, i.e. the X-axis and the Y-axis components of finger displacement will cause proportional X-axis and Y-axis movements of the cursor. This correspondence applies to both straight line displacement, and displacement along any type of curved path.

In the present example, displacement of the user's finger along the line segment 170 has caused a proportional movement of the cursor 156 along the line segment 172.

Following the initial depression of the screen and establishment of the reference point 158, either of two subsequent events may occur. The operator may lift his finger from the touchscreen device prior to its having left the "absolute mode zone" 160, in which case the cursor 156 stops at the point it occupied when the finger was lifted. Alternately, the user may continue to "drag" his finger so that it crosses one boundary 168, for example, of the initially-established "absolute mode zone" 160; under such circumstances, the program in the microprocessor 32 calls for a conversion in the nature of relative movement between the cursor 156 and the finger from one of proportional displacement, to one where the cursor 156 now moves at a velocity which is proportional to finger displacement. This movement outside the "absolute mode zone" 160 is referred to as movement of the cursor 156 in the "velocity mode". In such case, the movement of the cursor 156, as to direction, follows that of the finger to a location 156'. The cursor 156 will now move along the line segment 174, to location 156', at a velocity that is proportional to the displacement of the user's finger along the line segment 176. Note that segment 174 is longer than segment 176 because of the switching from the "absolute mode" to the "velocity mode", which results in a relatively greater movement of the cursor for a given finger displacement. This "velocity mode" thus is of advantage where it is desired to move the cursor quickly from one area of the screen to another.

Figure 5:
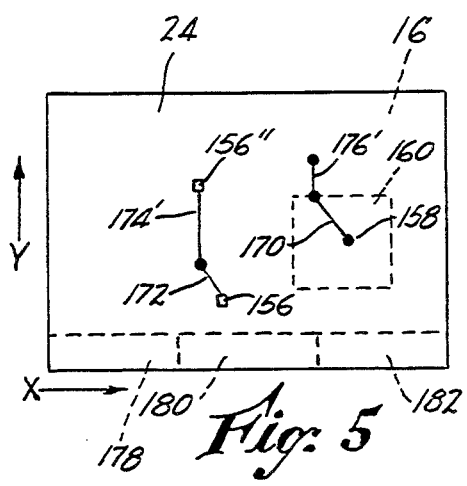
FIG. 5 is a view like that of FIG. 4, and showing another example of cursor movement control as provided by the invention.

As another example, in FIG. 5 there is illustrated again the touchscreen device of FIG. 4. Upon initially depressing the touchscreen device at location 158, a reference point is automatically established at point 158 and an "absolute mode zone" 160 also established and stored in the microprocessor 32. Assuming that the user displaces or drags his finger along the segment 170 in FIG. 5, the cursor 156 will correspondingly move along the line segment 172. When the finger displacement reaches the boundary of the zone 160, if the user now changes direction and displaces or drags his finger along the segment 176', the cursor 156 will move along the segment 174' at a velocity which is proportional to the finger displacement along segment 176'. This cursor movement is according to the "velocity mode" until the finger is lifted. The direction of movement of the cursor is the same, with respect to X and Y axes, as the direction of finger displacement.

The program is arranged to operate in a continuous loop which, as can be seen in the Algorithm of FIG. 7, always begins at the oval labelled "start", upon start up of the equipment, or upon the user removing his finger from the touchscreen device 24.

It is noted that prior to initial depression of the touchscreen device the cursor is stationary on the display screen 16, and that it remains stationary at the moment that the touchscreen device 24 is first depressed. Movement of the cursor 156 does not commence until the user drags his finger along the touchscreen device 24.

Also, it is to be emphasized that with the arrangement of the present invention, it is of no significance as to what point on the touchscreen device 24 is chosen to be the point of first depression. The program accommodates any point on the screen (with the exception of three special zones to be described below) as a reference point 158, unlike many other touchscreen device applications, where the cursor usually jumps to the area directly underneath the user's finger when the touchscreen device is depressed. Along with the establishment of the reference point 158, there is automatically defined the "absolute mode zone" 160 surrounding this reference point, as noted above, and movement of the user's finger within this zone 160 results in movement of the cursor 156 in the "absolute mode", i.e. cursor movement proportional to displacement of the user's finger, and in the direction of the displacement of user's finger. On the other hand, movement of the user's finger across any of the four boundaries of the zone 160 results in an automatic conversion of cursor movement to the "velocity mode", i.e. the cursor 156 moves at a velocity which is proportional to finger displacement as long as the finger is not lifted.

Further in accordance with the invention, there are provided at one, two or three locations on the touchscreen device, what are termed "mouse switch zones". In the present embodiment, three such zones 178, 180 and 182 are provided along the lower edge of the touchscreen device 24, and each has a vertical dimension of about ¾ inch, and a horizontal width of about 3 to 3 ½ inches, for a touchscreen device having an 8×11 inch size. The three zones are illustrated in FIGS. 4 and 5.

The Algorithm and program are arranged to recognize depression of the touchscreen device in any of these three zones, as the equivalent of a mouse "switch" function. Typically mouse devices incorporate two manually activated switches as at 20 in FIG. 8, some of the more sophisticated devices incorporating three.

In the Algorithm, these zones are collectively referred to as a "switch area".

As an example, if the user depresses a point on the touchscreen device which is outside of this "switch area", then cursor control proceeds as outlined above, namely, cursor movement within the "absolute mode zone" being proportional to finger displacement, and cursor movement outside this "absolute mode zone", being in a "velocity mode". After the cursor has arrived at the desired location, a mouse switch closure can be simulated by the user merely lifting his finger off the screen and momentarily depressing the desired area of the screen corresponding to mouse switch zone 178, 180 or 182. The program automatically converts this depression into a signal that is fed to the dedicated mouse port connector receptacle 154, and which is read by the mouse port and computer as a mouse switch closure, not the screen depression which actually initiated it.

As an illustration of the various possible activities which can occur at the touchscreen device, several examples of operation will be reviewed, and with reference to the Algorithm of FIG. 7.

The boxes in the Algorithm of FIG. 7 are labelled 184, 185, 186, 188, 190 and 192, respectively, and the diamonds labelled 194, 196, 198 and 200, respectively. Diamonds represent inquiries, whereas boxes indicate actions taken by the program in response to a "YES" or "NO" answer to the inquiry set forth in the respective diamond.

From the oval legend "START", referring to the box 184, when the touchscreen device 24 is first depressed at any random point (above the mouse switch zones 178, 180, 182), a reading of the location of the depression by X-axis and Y-axis coordinates is taken, and stored in the microprocessor 32 for use as the initial reference point 158. If the user lifts his finger immediately, or only after a short movement, then the answer to the inquiry in the subsequent diamond 194 is "NO"; box 186 indicates the result, namely that the program then halts the cursor, and readies it for subsequent movement in solely an "absolute mode". Then the program reverts to the starting point, in readiness for the next depression.

On the other hand, if the user depresses the screen and holds it, then the response to the inquiry of diamond 194 is YES, and as a result the subsequent diamond 196 queries whether this depression is within the mouse switch area 178, 180 or 182, or not. If the response to this inquiry is YES, as a result of the depression being in the switch area, then according to box 185, the cursor 156 is halted, the appropriate signal indicating activation of a mouse switch sent to the mouse port 154 of the computer, and the program set in an "absolute mode" in readiness for the next depression, after the depression of the switch area is released.

Alternately, if the (continued) depression is not in the switch area, then the answer to the inquiry in diamond 196 is NO; the program then inquires if the depression is the first time the touchscreen device is depressed. In response to a YES answer, box 188 indicates that the program then sets the initial point of depression as the reference point, establishes the boundaries of the "absolute mode zone" 160, and directs the cursor 156 to move in the absolute mode. In response to a NO answer, the program queries whether the point of depression has moved outside of the "absolute mode zone" 160, as by the user dragging his finger. In response to a NO answer, the cursor would continue to move with finger displacement in an "absolute mode", as indicated by box 190. In response to a YES answer, box 192 indicates that the program would switch the cursor movement to a "velocity mode", wherein the cursor 156 would move with a velocity that was proportional to finger displacement measured from the boundary crossing, as opposed to moving a distance that was proportional to finger displacement. Naturally the user can watch the cursor as it is being moved, and adjust his finger displacement as needed, to produce the desired response.

It is to be noted that in an "absolute" mode, the cursor 156 can be made to move a distance which differs from a strict 1:1 relationship to finger displacement, i.e. the program can be set so that a finger displacement of 1 inch corresponds to a cursor displacement of 0.25 inches, a 4:1 ratio, for example. Other ratios can be chosen and incorporated in the program, to achieve different degrees of control, and depending on the requirements of resolution of movement of the cursor. If a high degree of precision in the positioning of the cursor were desired, the program could be set for a high ratio of finger displacement to cursor movement, to permit precise positioning of the cursor on the display screen.

The invention also embodies a novel and improved method of controlling the movement of a cursor by means of a touchscreen device, as set forth below, and with reference to FIGS. 1, 2, 4, 5, and 10: In a computer 10 having a monitor 12 with a display screen 16; a touchscreen device 24 having an expansive working surface and a pointer or pointing means 23 moveable over the surface along X-axis and Y-axis directions; and an electronic interface circuit 120, 32 connected between the touchscreen device 24 and the computer 10; the method of controlling the movement of a cursor 156 on the display screen 16, which comprises the steps of establishing a reference point 158 on the touchscreen device 24, when the pointing means 23 is initially introduced to a random point on the screen 24, said reference point 158 being characterized by an X-axis coordinate and a Y-axis coordinate, storing the X-axis coordinate and the Y-axis coordinate corresponding to said reference point 158 in said interface circuit 32, 120 as long as said pointing means 23 remains in sufficiently close proximity to the screen 24 to continue influencing it, generating a signal in the interface unit 32, 120 which identifies by coordinate, any displacement of the pointing means 23 from the coordinates of the reference point 158, and feeding the signal to the computer 10 to instruct the computer to move the cursor 156 in the same direction as the displacement of the pointing means 23, and also to move the cursor 156 by a distance which is proportional to the displacement of the pointing means 23, measured from said reference point 158, and halting movement of the cursor 156 either when displacement of the pointing means 23 stops, or when the pointing means 23 is withdrawn out of proximity to the screen 24.

In the method of the invention, the cursor 156 remains motionless when the pointing means 23 is first introduced to the screen 24, and prior to any displacement of the pointing means 23. Also, according to the method of the invention, any point on the screen 24 can be selected as the initial reference point 158, such point being identified by a particular X-axis coordinate and a particular Y-axis coordinate.

.Also by the method of the invention, there is established along with the definition of the reference point 156, an "absolute mode zone" 160 which is preferably a rectangular or square imaginary box that surrounds the reference point 156 and which has for its center the said reference point. When pointer 23 moves within this zone 160, the cursor moves a distance which is proportional to the displacement of the pointer 23 from the reference point 158. If the pointer is dragged across a boundary of this zone 160, the cursor is directed to move at a velocity which is proportional to the displacement of the pointer 23, measured from the boundary, and in a direction corresponding to that of the pointer.

By the invention, if the pointer 23 is withdrawn from the screen 24, the cursor is automatically halted; upon re-application of the pointer 23 to the screen 24, there is automatically established a new reference point 158 according to the approach of the pointer 23 to or onto the screen 24, and a new zone 160. Subsequent movement of the pointer 23 on or over the screen 24 results in either proportional movement of the cursor 156, or "velocity mode" movement of said cursor.

The invention as illustrated and described has the following important advantages. First, the mouse simulator of the invention combines the features of high resolution obtainable by a touchscreen device without sacrificing table or desk space, as would be the case with a conventional mouse simulator. Since the area in front of the computer monitor is already available, locating the touchscreen device at this area in effect frees the space which would otherwise be required in order to operate a conventional mouse or mouse simulator touchpad.

Since the touchscreen device/interface circuit of the invention plugs directly into the dedicated mouse port of the computer and communicates with the port in the exact protocol as would a conventional or generic mouse, absolutely no additional or special software is required for the computer in order to support the simulator. This feature wherein the interface circuit of the invention is devoid of additional software, is a distinct improvement over prior systems, which almost always required additional adaptive software.

Further, no hardware changes are required to be made in the computer. All of the hardware that is employed with the simulator of the present invention is outboard of the computer, that is, the simulator/interface circuit of the invention is devoid of additional hardware interior of the computer. The simulator can be conveniently mounted in a small package, in-line with the connections between the touchscreen device and the mouse port connector plug 152.

Troubleshooting is simplified with the present arrangement. If problems occur, it is merely necessary to unplug the touchscreen device connector 152, and substitute a conventional mouse, FIG. 8, in order to determine the nature of the problem, i.e. is the problem with the touchscreen circuitry, or is it in the computer hardware/software itself?

Also, with the present invention, problems which occurred with prior touchscreen devices and which involved parallax are completely avoided. The present arrangement is not affected by parallax. In fact, the touchscreen device of the present invention does not necessarily have to be mounted directly over the monitor screen. It can be displaced laterally therefrom (above, below, left, right), with no sacrifice in operation. Also, it could be located remotely from the screen, as for example, to the side, above it, or below it. Finally, although it is preferable for the touchscreen device to be mounted in front of and be of a size comparable to the monitor screen, deviations in size do not adversely affect operation. Stated differently, the touchscreen device could be either larger than or smaller than the monitor screen, and still be fully functional and useable with the computer. The arrangement thus more closely approximates a "universal" add-on accessory than is the case with conventional touchscreen devices which must directly overlie the monitor screen, and be of the same physical dimensions in X and Y directions.

Resolution problems involving the cursor being inadvertently hidden beneath the pointer, or beneath the user's finger are completely avoided, as a consequence of the mode of operation, involving the randomly-selectable reference point as described above.

The present arrangement, not requiring software support, does not tie up computer storage in the least. Full memory capacity is retained, for possible use with other programming options.

No connections are made to either the serial input/output port, or to expansion slots of the computer. Thus, the computer cabinet need not be opened, and there is no liability of damage to such slots, or to possible voiding of a warranty due to prohibitions or restrictions against opening the computer console. All existing slots remain available for other uses, as desired.

Compatibility problems between computer hardware and computer software are not affected by the installation and use of the simulator of the invention, since the simulator simply emulates a conventional mouse, and accomplishes this through the dedicated mouse port of the computer.

Finally, the arrangement described has the capability of duplicating mouse switch functions through the touchscreen itself, by virtue of the hardware and firmware of the interface circuit automatically reserving up to three "switch" zones at the bottom of the screen. Touching any one of these zones is detected in the program, and an emulation of a mouse switch closure is sent to the dedicated mouse port through the cable 150 that connects with the output of the mouse driver 132, FIGS. 2 and 6.

The device and method of the invention are thus seen to represent a distinct advance and improvement in the technology of mouse simulators and touchscreen devices.

Variations and modifications are possible without departing from the spirit of the invention.

Each and every one of the appended claims defines an aspect of the invention which is separate and distinct from all others, and accordingly it is intended that each claim be treated as such when examined in the light of the prior art devices in any determination of novelty or validity.

APPENDIX A

SOURCE CODE - ASSEMBLY LANGUAGE PROGRAM "JV5"
for implementing Algorithm of Fig. 7

```
;           CTI-18              TEST PIN P3.2
;           JV5         TOUCHSCREEN
;           R4=XCOUNT  R5=DLYRX
;           R2=YCOUNT  R3=DLYRY
;;;;
SWDLY       EQU         40
S1DLY       EQU         21
BAUD1       EQU         E8H
XMTDLY      EQU         10          ;R1 CLK
DLTADN      EQU         50          ;LOPAS
VLCTN       EQU         45          ;SW FROM DISLP. TO VEL.

CODE
            ORG         0
            AJMP        RST

ORG         0BH
VTR0:       CPL         P1.5                    ;ADCLK
            MOV         TL0,#210                ;PT0=0
            JNB         P1.5,$+5
            SETB        RISNGF
            RETI

ORG         01BH
            AJMP        VTR1

ORG         23H
```

```
VSINT:  PUSH    A
        PUSH    PSW
        MOV     PSW,#0
SEND:   CLR     TI
        CLR     TR0                     ;COUNT
        MOV     A,R0
        MOV     DPTR,#SERIAL
        JMP     @A+DPTR

VTR1:   PUSH    PSW                     ;PT1=1
        MOV     PSW,#0
        JNB     VELCTF,T1L2
        DJNZ    R5,T1L1
        INC     R4
        MOV     R5,DLYRX
T1L1:   DJNZ    R3,T1L2
        INC     R2
        MOV     R3,DLYRX
T1L2:   DJNZ    R6,T1N                  ;1.11 MS
        MOV     R6,#4
        INC     SWCLK
        INC     R1
        DJNZ    R7,T1N                  ; 71 MS !!!
        MOV     R7,#64
        INC     S1CLK                   ;LATCH
T1N:    POP     PSW
        RETI
;;;;
RST:    MOV     P1,#FFH
        MOV     P0,#FFH
        MOV     P2,#FFH
        MOV     P3,#FFH
        MOV     PSW,#0
        MOV     SP,#STACKP
        MOV     TH1,#BAUD1
        MOV     SCON,#40H
        MOV     TMOD,#23H
        MOV     TCON,#40H
        MOV     PCON,#0
        MOV     FLAGS,#0
        MOV     FLAGS1,#0
        MOV     FLAGS2,#0
        MOV     FLAGS3,#0
        MOV     STATUS,#0
        MOV     SWITCH,#0
        MOV     SWNEW,#0
        SETB    RS0
        CLR     RS1
        MOV     R1,#8
        MOV     R4,#0
        MOV     R5,#0
        MOV     R6,#0
        MOV     R7,#0
        SETB    RS1
        CLR     RS0
        MOV     R1,#8
        MOV     R4,#0
        MOV     R5,#0
        MOV     R6,#0
        MOV     R7,#0
        MOV     PSW,#0
        MOV     R0,#0
        MOV     R2,#0
        MOV     R4,#0
        MOV     R3,#255
        MOV     R5,#255
        MOV     R6,#04
        MOV     R7,#64
        MOV     IP,#0AH
        MOV     IE,#9AH
```

```
;;;;
START:  MOV     PSW,#0

GETX:   SETB    P0.7
        CLR     P0.6

;;;;    DELAY
        CALL    TSTSWS

MOV     A,#FFH
        DEC     A
        CJNE    A,#0,$-1
        DEC     A
        CJNE    A,#0,$-1
        DEC     A
        CJNE    A,#0,$-1
        DEC     A
        CJNE    A,#0,$-1

CALL    TSTSWS

CALL    COUNT
        CALL    LOPASX
        MOV     A,LCOUNT
        MOV     XADN,A

JB      XMTF,$+6
        CALL    XMTST

GETY:   SETB    P0.6
        CLR     P0.7

;;;;    DELAY
        CALL    TSTSWS

MOV     A,#FFH
        DEC     A
        CJNE    A,#0,$-1
        DEC     A
        CJNE    A,#0,$-1
        DEC     A
        CJNE    A,#0,$-1
        DEC     A
        CJNE    A,#0,$-1

CALL    TSTSWS
        JB      XMTF,$+6
        CALL    XMTST
        CALL    COUNT
        CALL    LOPASY
        MOV     A,LCOUNT
        MOV     YADN,A

JB      XMTF,$+6
        CALL    XMTST

MAIN:   JB      TOUCHF,ML0
        MOV     A,XADN
        CJNE    A,#250,$+3
        JC      ML5
        AJMP    ML8
ML5:    MOV     A,YADN
        CJNE    A,#250,$+3
        JC      ML55
        AJMP    ML8
ML55:   SETB    TOUCHF
        CLR     VELCTF
        MOV     R2,#8    ;FLTR
        MOV     XADNLD,XADN
        MOV     YADNLD,YADN
        MOV     XADLD1,XADN
        MOV     YADLD1,YADN
        AJMP    MLN
```

```
ML0:    MOV     A,XADN
        CJNE    A,#250,$+3
        JNC     ML11
        MOV     A,YADN
        CJNE    A,#250,$+3
        JNC     ML11
        SJMP    ML1
ML11:   DJNZ    R2,$+6   ;ML8
        CLR     TOUCHF
        CLR     VELCTF
        AJMP    ML8
ML1:    MOV     A,YADN
        CJNE    A,#55,$+3
        JNC     ML2
        AJMP    ML8
ML2:    CLR     ES
        MOV     A,YADNLD
        CLR     C
        SUBB    A,YADN
        JNC     $+6
        SETB    SIGNY
        SJMP    $+4
        CLR     SIGNY
        JNB     SIGNY,$+6
        CPL     A
        ADD     A,#1
        ADD     A,R2
        XCH     A,R2     ;R2 = YCOUNT
        MOV     A,XADNLD
        CLR     C
        SUBB    A,XADN
        JNC     $+6
        SETB    SIGNX
        SJMP    $+4
        CLR     SIGNX
        JNB     SIGNX,$+6
        CPL     A
        ADD     A,#1
        ADD     A,R4
        XCH     A,R4     ;R4 = XCOUNT
        SETB    ES
ML9:    JB      VELCTF,ML7
        MOV     A,XADLD1
        SUBB    A,XADNLD
        JNC     $+5
        CPL     A
        ADD     A,#1
        CJNE    A,#VLCTN,$+3
        JC      $+4
        SETB    VELCTF
        MOV     A,YADLD1
        SUBB    A,YADNLD
        JNC     $+5
        CPL     A
        ADD     A,#1
        CJNE    A,#VLCTN,$+3
        JC      $+4
        SETB    VELCTF
        MOV     XADNLD,XADN    ;REST ADNLD IF IN DISPL.
        MOV     YADNLD,YADN    ;OR FIRST TIME VELCTY !
ML6:    SJMP    MLN

ML7:    SETB    VELCTF
        MOV     A,YADNLD
        CLR     C
        SUBB    A,YADN
        JNC     $+6
        SETB    SIGNY
        SJMP    $+4
        CLR     SIGNY
        JNB     SIGNY,$+6
        CPL     A
        ADD     A,#1
        CALL    CURVE
```

```
        MOV     DLYRG,R3
        CJNE    A,DLYRG,$+3
        JNC     $+3
        MOV     R3,A
        MOV     DLYRY,A

MOV     A,XADNLD
        CLR     C
        SUBB    A,XADN
        JNC     $+6
        SETB    SIGNX
        SJMP    $+4
        CLR     SIGNX
        JNB     SIGNX,$+6
        CPL     A
        ADD     A,#1
        CALL    CURVE

MOV     DLYRG,R5
        CJNE    A,DLYRG,$+3
        JNC     $+3
        MOV     R5,A
        MOV     DLYRX,A
        SJMP    MLN

ML8:    CLR     ES
        MOV     XCOUNT,#0
        MOV     YCOUNT,#0
MLN:    SETB    ES
        JB      XMTF,$+6
        CALL    XMTST

AJMP    START.

;;;;
;COUNT;          P1.3 = /ADCS
;                P1.4 = ADIN START
;                P1.5 = ADCLK
;                P1.7 = ADOUT
;;;;
COUNT:  SETB    P1.3        ;ALWAYS IN PSW=0
        CLR     P1.5        ;ADCLK
        CLR     RISNGF
        CLR     P1.3        ;ADCS
        MOV     TL0,#220
        SETB    TR0
        SETB    P1.4        ;ADI START
        JNB     TR0,COUNT
        JNB     RISNGF,$-3
        CLR     RISNGF
        SETB    P1.4        ;SINGLE
        JNB     TR0,COUNT
        JNB     RISNGF,$-3
        CLR     RISNGF
        CLR     P1.4        ;ODD
        JNB     TR0,COUNT
        JNB     RISNGF,$-3
        CLR     RISNGF
        CLR     P1.4        ;SELECT B1
        JNB     TR0,COUNT
        JNB     RISNGF,$-3
        CLR     RISNGF
        SETB    P1.4        ;SELECT B0
        JNB     TR0,COUNT
        JNB     RISNGF,$-3
        CLR     RISNGF
        JNB     TR0,COUNT
        JNB     RISNGF,$-3
        CLR     RISNGF      ;XTRA   CLK
        JNB     TR0,COUNT
        JNB     RISNGF,$-3
        CLR     RISNGF
        JB      P1.7,$+7            ;ADOUT
        CLR     ADN.7
        SJMP    $+4
```

```
          SETB    ADN.7
          JNB     TR0,COUNT
          JNB     RISNGF,$-3
          CLR     RISNGF
          JB      P1.7,$+7
          CLR     ADN.6
          SJMP    $+4
          SETB    ADN.6
          JNB     TR0,COUNT
          JNB     RISNGF,$-3
          CLR     RISNGF
          JB      P1.7,$+7
          CLR     ADN.5
          SJMP    $+4
          SETB    ADN.5
          JNB     TR0,CNTL
          JNB     RISNGF,$-3
          CLR     RISNGF
          JB      P1.7,$+7
          CLR     ADN.4
          SJMP    $+4
          SFTB    ADN.4
          JNB     TR0,CNTL
          JNB     RISNGF,$-3
          CLR     RISNGF
          JB      P1.7,$+7
          CLR     ADN.3
          SJMP    $+4
          SETB    ADN.3
          JNB     TR0,CNTL
          JNB     RISNGF,$-3
          CLR     RISNGF
          JB      P1.7,$+7
          CLR     ADN.2
          SJMP    $+4
          SFTB    ADN.2
          JNB     TR0,CNTL
          JNB     RISNGF,$-3
          CLR     RISNGF
          JB      P1.7,$+7
          CLR     ADN.1
          SJMP    $+4
          SETB    ADN.1
          JNB     TR0,CNTL
          JNB     RISNGF,$-3
          CLR     RISNGF
          JB      P1.7,$+7
          CLR     ADN.0
          SJMP    $+4
          SETB    ADN.0
          CLR     TR0
          SETB    P1.3
CNTN:     RET
CNTL:     AJMP    COUNT

;;;;
CURVE:    CJNE    A,#87,$+3
          JC      CM1
          MOV     A,#87       ;MAX
CM1:      CLR     ES
          MOV     DPTR,#TABLE
          MOVC    A,@A+DPTR
          SETB    ES
CMN:      RET
TABLE:    DB      224
          DB      224
          DB      199
          DB      179
          DB      163
          DB      150
          DB      138
          DB      129
          DB      120
```

| | |
|---|---|
| DB | 112 |
| DB | 106 |
| DB | 100 |
| DB | 95 |
| DB | 90 |
| DB | 86 |
| DB | 82 |
| DB | 78 |
| DB | 75 |
| DB | 72 |
| DB | 69 |
| DB | 67 |
| DB | 65 |
| DB | 63 |
| DB | 60 |
| DB | 58 |
| DB | 56 |
| DB | 54 |
| DB | 52 |
| DB | 51 |
| DB | 50 |
| DB | 49 |
| DB | 48 |
| DB | 47 |
| DB | 46 |
| DB | 45 |
| DB | 44 |
| DB | 43 |
| DB | 42 |
| DB | 40 |
| DB | 39 |
| DB | 38 |
| DB | 37 |
| DB | 37 |
| DB | 36 |
| DB | 36 |
| DB | 35 |
| DB | 35 |
| DB | 34 |
| DB | 34 |
| DB | 33 |
| DB | 33 |
| DB | 32 |
| DB | 31 |
| DB | 31 |
| DB | 30 |
| DB | 30 |
| DB | 29 |
| DB | 29 |
| DB | 28 |
| DB | 28 |
| DB | 28 |
| DB | 27 |
| DB | 27 |
| DB | 27 |
| DB | 26 |
| DB | 26 |
| DB | 26 |
| DB | 25 |
| DB | 25 |
| DB | 25 |
| DB | 24 |
| DB | 24 |
| DB | 24 |
| DB | 23 |
| DB | 23 |
| DB | 23 |
| DB | 22 |
| DB | 22 |
| DB | 22 |
| DB | 21 |
| DB | 21 |
| DB | 21 |
| DB | 20 |

```
              DB      20
              DB      20
              DB      20
              DB      20
              DB      20
              DB      20
              DB      20
              DB      20
              DB      20
              DB      20
              DB      20
              DB      20
              DB      20
              DB      20
              DB      20
              DB      20
;;;;
LOPASX: SETB    RS0
        CLR     RS1
LPXX:   MOV     A,ADN
        CJNE    A,#250,$+3
        JNC     LPXA    ;;;;;; TOUCHS
LPX1:   CLR     C
;       SUBB    A,R6    ;R6=OLD
;       JNC     $+5
;       CPL     A
;       ADD     A,#1
;       CJNE    A,#DLTADN,$+3
        MOV     A,R6
        CJNE    A,#250,$+3
        JC      LPX0
LPXA:   MOV     R6,ADN
        MOV     R7,#0
        SJMP    LPX3
LPX0:   MOV     A,ADN
        ADD     A,R4
        XCH     A,R4
        XCH     A,R5
        ADDC    A,#0
        XCH     A,R5
        DJNZ    R1,LPX2
        XCH     A,R4
        RR      A
        RR      A
        RR      A
        ANL     A,#1FH
        XCH     A,R4
        MOV     A,R5
        SWAP    A
        ANL     A,#70H
        RL      A
        ADD     A,R4
        MOV     R6,A    ;SAVE
        MOV     R7,#0
LPX3:   MOV     R1,#8
        MOV     R4,#0
        MOV     R5,#0
LPX2:   MOV     LCOUNT,R6
LPXN:   MOV     PSW,#0
        RET

LOPASY: SETB    RS1
        CLR     RS0
        MOV     A,ADN
        CJNE    A,#56,$+3       ;;TOUCH
        JC      LPXA            ;;SWS
        AJMP    LPXX
;;;;
;TSTSWS: A IS NOT RESTORED, SETS SWF AND
;        DEBOUNCES SWS (20 MS).
;;;;
TSTSWS: MOV     A,YADNLD
        CJNE    A,#56,$+3
        JC      J9
```

```
            MOV     A,#0
            SJMP    J0
J9:         MOV     A,#04       ;L.SW
            SJMP    J0

;;;;;;;;;;
            CJNE    A,#165,$+3
            JNC     $+6
            MOV     A,#02       ;M.SW
            SJMP    J0
            MOV     A,#01       ;R.SW
J0:         CJNE    A,SWITCH,J1
            MOV     SWNEW,A
            CLR     F1
            SJMP    SWN
J1:         JNB     F1,J2
            CJNE    A,SWNEW,J2
            SJMP    J3
J2:         MOV     SWNEW,A
            MOV     SWCLK,#0
            SETB    F1
J3:         MOV     A,#SWDLY
            CJNE    A,SWCLK,$+3
            JNC     SWN
            CLR     F1
            MOV     SWITCH,SWNEW
            SETB    SWF
SWN:        NOP

LATCH:      MOV     A,SWITCH
            JNB     ACC.2,LCH1
            JB      S1OFF,LCH2
            JB      LEDF,LCHN
            JB      STMRF,LCH3
            SETB    STMRF
            MOV     S1CLK,#0
            SJMP    LCHN
LCH3:       MOV     A,S1CLK
            CJNE    A,#S1DLY,$+3
            JC      LCHN
            SETB    LEDF
            CLR     S1OFF
            CLR     STMRF
            SJMP    LCHN
LCH1:       JNB     LEDF,LCH2
            SETB    S1OFF
            SJMP    LCHN
LCH2:       CLR     LEDF
            CLR     S1OFF
            CLR     STMRF
LCHN:       RET
;;;;
XMTST:      JNB     XMTF,$+4
            RET
            JNB     XMTDLF,XMTL1
            CJNE    R1,#XMTDLY,$+3
            JNC     XMTL1
            RET
XMTL1:      CLR     XMTDLF
            JB      SWF,SERIAL
            MOV     A,R4
            JNZ     SERIAL
            MOV     A,R2
            JNZ     SERIAL
            JNB     P3.2,SERIAL     ;'TEST PIN
            RET

SERIAL:     MOV     A,SWITCH
            JNB     LEDF,$+5
            SETB    ACC.2           ;SW LATCH
            SETB    ACC.7
            MOV     SBUF,A
            MOV     R0,#(SERX-SERIAL)
            RET
```

```
SERX:    MOV    A,R4
         MOV    R4,#0
         JZ     $+8
         JNB    SIGNX,$+6
         CPL    A
         ADD    A,#1
         MOV    SBUF,A
         MOV    R0,#(SERY-SERIAL)
         POP    PSW
         POP    A
         RETI

SERY:    MOV    A,R2
         MOV    R2,#0
         JZ     $+8
         JNB    SIGNY,$+6
         CPL    A
         ADD    A,#1
         MOV    SBUF,A
         MOV    R0,#(SERX1-SERIAL)
         POP    PSW
         POP    A
         RETI

SERX1:   MOV    A,R4
         MOV    R4,#0
         JZ     $+8
         JNB    SIGNX,$+6
         CPL    A
         ADD    A,#1
         MOV    SBUF,A
         MOV    R0,#(SERY1-SERIAL)
         POP    PSW
         POP    A
         RETI

SERY1:   MOV    A,R2
         MOV    R2,#0
         JZ     $+8
         JNB    SIGNY,$+6
         CPL    A
         ADD    A,#1
         MOV    SBUF,A
         MOV    R0,#(SERFIN-SERIAL)
         POP    PSW
         POP    A
         RETI

SERFIN:  CLR    XMTF
         MOV    R1,#0
         SETB   XMTDLF
         MOV    R0,#0
         POP    PSW
         POP    A
         RETI

DATA
         ORG    20H
FLAGS    DB
FLAGS1   DB
FLAGS2   DB
FLAGS3   DB
ADN      DB
         ORG    2FH
STATUS   DB

;;;;           FLAGS
LEDF     REG    20H.0
VELCTF   REG    20H.1
XMTDLF   REG    20H.3
SIGNX    REG    20H.4
SIGNY    REG    20H.5
```

```
;;;;        FLAGS1
XMTF    REG     21H.0
SWF     REG     21H.1
TOUCHF  REG     21H.4
RSTF    REG     21H.5
;;;;        FLAGS2
TOGLF   REG     22H.0
F1      REG     22H.1
ADSINF  REG     22H.3
ADRSTF  REG     22H.4
MUXF    REG     22H.5
RISNGF  REG     22H.6
ZEROF   REG     22H.7
;;;;        STATUS
SIOFF   REG     2FH.1
STMRF   REG     2FH.2
        ORG     30H
SECCLK  DB
SLOCLK  DB
SWCLK   DB
S1CLK   DB
SWITCH  DB
SWNEW   DB
LCOUNT  DB
XCOUNT  DB
YCOUNT  DB
TMPR1   DB
XADN    DB
YADN    DB
XADNLD  DB
YADNLD  DB
XADLD1  DB
YADLD1  DB
DLYRX   DB
DLYRY   DB
DLYRG   DB
STACKP  DB

END
```

APPENDIX B

HEX FILE "JV.5HEX"
Derived from Source Code appearing in Appendix A,
and identifying specific data bytes
and addresses entered into Microprocessor 32

```
:020000000155A8
:0B000B00B295758AD2309502D21632F1
:02001B000133AF
:100023000C0E0C0D075D000C299C2BCE890043C7384
:100033000C0D075D000030010ADD030CAD40DB030AEC
:100043000AB40DE0B7E04053209DF047F400533D06D
:100053000D0327590FF75B0FF75A0FF75B0FF75D026
:10006300007581437580E8759840758923758840BF
:10007300075870075200075210075220075230075B2
:100083002F00753400753500D2D3C2D479087C00B3
:100093007D007E007F00D2D4C2D379087C007D002E
:1000A3007E007F0075D00078007A007C007BFF7DA6
:1000B300FF7E047F4075B80A75A89A75D000D28771
:1000C300C2861203AD74FF14B400FC14B400FC1414
:1000D300B400FC1203AD12021812036244
:1000E300E536F53A00803120420D286C2871203AC
:1000F300AD74FF14B400FC14B400FC14B400FC147D
:10010300B400FC1203AD200803120420120218120DB
:1001130003A0E536F53B00803120420200C26E556
:100123003AB4FA0040024106E53BB4FA004002410A
:1001330006D20CC2017A08853A3C853B3D853A3E9E
:10014300853B3F410EE53AB4FA005009E53BB4FA6A
:1001530000050028008DA04C20CC2014106E53BB438
:100163003700500024106C2ACE53DC3953B5004D273
:10017300058002C205300503F424012ACAE53CC305
```

```
:10018300953A5004D2048002C204300403F42401DB
:10019300 2CCCD2AC20 0128E53E953C5003F424013D
:1001A300B42D004002D201E53F953D5003F42401F4
:1001B300B42D004002D201853A3C853B3D804CD2B0
:1001C30001E53DC3953B5004D2058002C2053005CD
:1001D30003F424011202EE8B42B542005001FBF5F9
:1001E3004 1E53CC3953A5004D2048002C204300472
:1001F30003F424011202EE8D42B542005001FDF5D5
:100203004 08008C2AC753700753800D2AC200803B3
:100213001 2042001BED293C295C216C293758ADC22
:10022300D28CD294308CEE3016FAC216D294308C23
:10023300E43016FAC216C294308CDA3016FAC216BB
:10024300C294308CD03016FAC216D294308CC63099
:100253001 6FAC21 6308CBE3016FAC216308CB6307F
:100263001 6FAC216209704C2278002D227308CA523
:10027300301 6FAC216209704C2268002D226308C8A
:10028300943016FAC216209704C2258002D2253074
:100293008C5730 16FAC216209704C2248002D22447
:1002A300308C463016FAC216209704C2238002D23D
:1002B3002330 8C3530 16FAC216209704C2228002EE
:1002C300D22308C2430 16FAC216209704C2218021
:1002D30002D22130 8C13301 6FAC216209704C220A2
:1002E3008002D220C28CD29322411 8B4570040021C
:1002F3007457C2AC9002FE93D2AC22E0E0C7B3A322
:10030300968A8178706A645F5A56524E4B484543C9
:0103130041A8
:100314003F3C3A38363433323130 2F2E2D2C2B2AB1
:10032400282726252524242322222121201F1F98
:100334001E1E1D1D1C1C1C1B1B1B1A1A1A19191905
:1003440018181817171716161615151514141414B
:10035400141414141414141414141414141D2D3DC
:10036400C2D4E524B4FA005007C3EEB4FA00400640
:10037400AE247F00801AE5242CCCCD3400CDD916D0
:10038400CC0303035 4 1FCCEDC45470232CFE7F0014
:1003940079087C007D008E3675D00022D2D4C2D379
:1003A400E524B4380040C96166E53DB43800400432
:1003B4007400800F7404800BB4A500500474028090
:1003C4000274 01B53406F535C211801D301105B52E
:1003D40035028007F535753200D21174 28B5320024
:1003E4005007C211853534D20900E53430E21F20AC
:1003F40079232000262 07A07D27A753300801CE501
:100404 0033B415004015D200C279C27A800D300091
:100414004D2798006C200C279C27A22300801224D
:10042400300306B90A00500122C20320090AEC7005
:100434 0007EA700430B20122E534300002D2E2D27D
:100444 00E7F599780E22EC7C006006300403F4246E
:100454 0001F5997822D0D0D0E032EA7A00600630F3
:10046400 00503F42401F5997836D0D0D0E032EC7C41
:10047400 006006300403F42401F599784AD0D0D002
:100484 00E032EA7A00 6006300503F42401F5997835
:100494 005ED0D0D0E032C2087900D2037800D0D048
:1004A400D0E03227434F5059524947485420 4354CF
:1004B4 00 49204 54C454354524F4E4943520 31390A
:1004C400 3839204 14C4C20524947484 5320524516
:0704D400534552 645442731
:0504FB0000000000 00FC
:01050A0000F0
:10050B000000000000000000000000000000000E0
:04051B000000000DC
:00000001FF
```

What is claimed is:

1. An electronic mouse simulator for a computer, said computer comprising existing mouse hardware and existing mouse software installed therein, said computer further having a monitor with a display screen and said computer providing a cursor movable on the display screen, said computer further having an exteriorly accessible dedicated mouse port connector receptacle, said mouse simulator comprising in combination:

a) means providing a see-through touchscreen device having an electrical output circuit characterized by an electrical parameter which varies in accordance with the position of a moveable pointer means which has a field of travel across the front of said touchscreen device, said touchscreen device-providing means being positionable directly in front of and overlying the exterior of the said display screen and enabling the cursor on the display screen to be seen through the touchscreen device, b) a multi-conductor cable and electrical connector carried thereby, said cable being disposed exterior to the computer and said connector being adapted to be plugged directly into the said exteriorly accessible dedicated mouse port connector receptacle of the computer, c) electronic conversion means disposed entirely exteriorly of said computer and having input circuitry connected to the output circuit of the see-through touchscreen device for converting said parameter from said touchscreen device output circuit into binary format, and said electronic conversion means having an output circuit for supplying data in said binary format, and d) additional electronic means disposed entirely exteriorly of said computer and including a programmed microprocessor having input circuitry connected with the output circuit of said electronic conversion means, said microprocessor input circuitry receiving said binary format data from said electronic conversion means output circuit, and said additional electronic means having output circuitry which is connected to said multi-conductor cable and which is adapted for direct connection, via said cable, to the dedicated mouse port connector receptacle of the computer, said mouse simulator enabling essentially complete emulation of cursor control functions of a conventional mouse, e) said additional electronic means being fully compatible with and functionally operational with said existing mouse hardware of the computer and with the said existing mouse software that is installed in the computer.

2. The invention as set forth in claim 1, wherein:

a) said touchscreen device-providing-means is of the resistive-type having a front plane with an electrical connection thereto, and a back plane with multiple electrical connections thereto, and b) a multiplexer having an output connected to drive said back plane connections, for impressing thereon alternating synchronized voltages corresponding to vertical and horizontal directions, respectively, c) said front plane connection extending to said electronic conversion means, so as to provide input signals thereto, which signals indicate a vertical position and a horizontal position of said movable pointer means applied to said front plane.

3. The invention as set forth in claim 1, wherein:

a) the output circuitry of said additional electronic means comprises a mouse driver circuit, to render compatibility with the signal levels and protocol of the exteriorly accessible dedicated mouse port connector receptacle.

4. The invention as set forth in claim 2, wherein:

a) said microprocessor comprises an EPROM.

5. The invention as set forth in claim 2, wherein:

a) said microprocessor is contained in a single electronic package and which package has said multiplexer.

6. An electronic mouse simulator for a computer, said computer comprising existing mouse hardware and existing mouse software installed therein, said computer further having a monitor with a display screen and said computer providing a cursor movable on the display screen, and said computer further having an exteriorly accessible dedicated mouse port connector receptacle, said mouse simulator comprising in combination:

a) means providing a see-through touchscreen device having an electrical output circuit characterized by an electrical parameter which varies in accordance with the X-axis and the Y-axis positions of a pointer having a field of travel across the front of said touchscreen device, said touchscreen device-providing means being positionable directly in front of and overlying the said display screen and enabling the cursor on the display screen to be seen through the touchscreen device, b) a multi-conductor cable and electrical connector carried thereby and disposed exterior to the computer, said cable and connector being adapted to be plugged directly to the said exteriorly accessible dedicated mouse port connector receptacle of the computer, and c) electronic means disposed entirely exteriorly of said computer, and including an analog-to-digital converter having an input circuit connected with said touchscreen device output circuit, said electronic means including a programmed microprocessor having input circuitry connected with the output circuit of said analog-to-digital converter, said electronic means having output circuitry connected to said multi-conductor cable, and said electronic means generating and receiving fully-emulating electrical signals which substantially fully emulate signals representing X-axis movement of an operative mouse normally connected to said dedicated mouse port connector receptacle when the pointer is moved in an X-axis direction, and which substantially emulate signals representing Y-axis movement of an operative mouse normally connected to said dedicated mouse port connector receptacle when the pointer is moved in a Y-axis direction, and said electronic means transmitting said fully-emulating signals from its output circuitry and through said multi-conductor cable, to the said dedicated mouse port connector receptacle of the computer, d) said electronic means being fully compatible with and functionally operational with said existing mouse hardware of the computer and with the said existing mouse software that is installed in the computer.

7. The invention as set forth in claim 6, wherein:

a) said computer is adapted to be used with a mouse having a manually activated switch, b) said touchscreen device having a predetermined area defined by a pair of X-axis coordinates and a pair of Y-axis coordinates, said electronic means further generating a signal at said dedicated mouse port connector receptacle which emulates manual activation of said mouse switch when said predetermined area on said touchscreen device is pointed at.

8. The invention as set forth in claim 6, wherein:

a) said computer is adapted to be used with a mouse having two manually activated switches, b) said touchscreen device having two predetermined areas each defined by a pair of X-axis coordinates and a pair of Y-axis coordinates, said electronic means further generating a signal at said mouse port connector receptacle which emulates manual activation of said mouse switches, respectively when said predetermined areas on said touchscreen device are pointed at.

9. An electronic mouse simulator for a computer, said computer comprising existing mouse hardware and existing mouse software installed in the computer, said computer further having an exteriorly accessible dedicated mouse port connector receptacle, and having a monitor with a display screen, said simulator comprising in combination:
  a) a manually-activatable touchscreen device characterized by an expansive surface having both X-axis and Y-axis directions, said touchscreen device having output circuitry,
  b) said touchscreen device having, within a predetermined pair of X-axis coordinates and a pair of Y-axis coordinates, a zone which, when manually activated, emulates the activation of a manually-operable switch on a mouse,
  c) electronic interface means disposed entirely exteriorly of the computer, and having input circuitry connected to the output circuitry of the touchscreen device,
  d) said electronic interface means being responsive to said manual activation of the zone, and being connected directly to the dedicated mouse port connector receptacle of the computer and in turn providing to the computer, a distinctive signal corresponding to that of a conventional mouse,
  e) said electronic interface means being fully compatible with and functionally operational with said existing mouse hardware of the computer and with the said existing mouse software that is installed in the computer.

10. The invention as set forth in claim 9, wherein:
  a) said touchscreen device has, within a predetermined pair of X-axis coordinates and a pair of Y-axis coordinates, an additional zone which, when manually activated, emulates the activation of a second manually-operable switch of the said mouse,
  b) said electronic interface means being responsive to manual activation of either the first-mentioned zone or the second zone, and in turn providing to the computer, a distinctive signal corresponding to that of a conventional mouse.

11. An electronic mouse simulator for a computer comprising existing mouse hardware and existing mouse software installed therein, said computer further having a display screen and an exteriorly accessible dedicated mouse port connector receptacle, comprising in combination:
  a) a see-through touchscreen disposed directly in front of and overlying the display screen of the computer,
  b) a multi-conductor cable having a plug fitting which is received in the exteriorly accessible dedicated mouse port connector receptacle of the computer, and
  c) electronic converter means connected with said touchscreen and multi-conductor cable, for receiving X-axis and Y-axis intelligence from the touchscreen and producing therefrom X-axis and Y-axis signals in said multi-conductor cable which simulate the conventional electronic intelligence of a mouse of the type normally intended for connection to said dedicated mouse port connector receptacle,
  d) said electronic converter means being fully compatible with and fully operation with said existing mouse hardware of the computer and with said existing mouse software that is installed in the computer.

12. The invention as set forth in claim 11, wherein:
  a) said converter means comprises an EPROM and a multiplexer.

13. The invention as set forth in claim 11, wherein:
  a) said computer, when operating with said electronic mouse simulator, is devoid of additional interior hardware beyond said said existing mouse hardware.

14. The invention as set forth in claim 11, wherein:
  a) said computer, when operating with said electronic mouse simulator, is devoid of additional software beyond said existing mouse software.

15. The invention as set forth in claim 1, wherein:
  a) the said emulation of cursor control functions of the conventional mouse are carried out by means of said pointer means' movements across said field of travel of the touchscreen device-providing-means.

16. The invention as set forth in claim 1, wherein:
  a) said computer, when operating with said electronic mouse simulator, is devoid of additional interior hardware beyond said existing mouse hardware.

17. The invention as set forth in claim 1, wherein:
  a) said computer, when operating with said electronic mouse simulator, is devoid of additional software beyond said existing mouse software.

18. The invention as set forth in claim 6, wherein:
  a) said computer, when operating with said electronic mouse simulator, is devoid of additional interior hardware beyond said existing mouse hardware.

19. The invention as set forth in claim 6, wherein:
  a) said computer, when operating with said electronic mouse simulator, is devoid of additional software beyond said existing mouse software.

20. The invention as set forth in claim 9, wherein:
  a) said computer, when operating with said electronic mouse simulator, is devoid of additional interior hardware beyond said said existing mouse hardware.

21. The invention as set forth in claim 9, wherein:
  a) said computer, when operating with said electronic mouse simulator, is devoid of additional software beyond said existing mouse software.

22. A mouse simulator for a computer comprising existing mouse hardware and existing mouse software installed therein, said computer further having a display screen, and an exteriorly accessible dedicated mouse port connector receptacle, said mouse simulator comprising, in combination:
  a) a manually-activatable see-through touchscreen for positioning directly in front of said computer display screen such that the latter underlies the touchscreen, said touchscreen providing X-axis and Y-axis output data,
  b) electronic means connected to said touchscreen to receive said X-axis and said Y-axis data therefrom, and to convert said data into mouse port-compatible signals, and
  c) a multi-wire cable connected to said electronic means to receive said mouse port-compatible signals therefrom,
  d) said cable having a connector plug fitting which is receivable in the dedicated mouse port connector receptacle of the computer to introduce said mouse port compatible signals into the latter, said electronic means enabling essentially complete emulation of cursor control functions of a conventional mouse, e) said electronic means being fully compatible with and functionally operational with said existing mouse hardware of the computer and with the said existing mouse software that is installed in the computer.

23. The invention as set forth in claim 22, wherein:
a) said computer, when operating with said mouse simulator, is devoid of additional interior hardware beyond said said existing mouse hardware.

24. The invention as set forth in claim 22, wherein:
a) said computer, when operating with said mouse simulator, is devoid of additional software beyond said existing mouse software.

25. The method of installing a touchscreen device on a monitor of a computer having a mouse, said computer having internal existing mouse hardware and existing mouse software, said computer having a dedicated mouse port electrical connector receptacle for said mouse, said touchscreen device comprising a see-through touchscreen having a window and being adapted for use with a pointing means, and said touchscreen device comprising a microprocessor disposed wholly exterior of the computer and having a program installed in said microprocessor, the output circuit of said microprocessor having an electrical connector receptacle adapted to mate with the dedicated mouse port electrical connector receptacle of the computer, said method comprising the steps of:

a) installing said see-through touchscreen in front of the computer monitor with its window overlying it, so as to enable the computer monitor to be viewed therethrough, b) unplugging the mouse from the dedicated mouse port electrical connector receptacle of the computer, c) plugging the electrical connector receptacle of the touchscreen device into the dedicated mouse port connector receptacle of the computer, and d) feeding mouse-simulating signals from the programmed microprocessor through the electrical connector receptacle of the touchscreen device and into the dedicated mouse port electrical connector receptacle of the computer, said signals fully emulating those of said mouse, and said signals being under the direct control of the pointing means utilized with the see-through touchscreen, e) said method of installing the touchscreen device being devoid of the addition of hardware to the interior of the computer beyond said existing internal mouse hardware, and said method being devoid of the addition of software to the computer beyond said existing mouse software, and said method being devoid of substitution of alternate hardware or software in the computer in place of said existing mouse hardware and said existing mouse software of the computer.

* * * * *